(12) United States Patent  (10) Patent No.: US 8,137,021 B2
Bohne et al.                (45) Date of Patent:     Mar. 20, 2012

(54) SEALING ELEMENT FOR A BALL AND SOCKET JOINT

(75) Inventors: Manfred Bohne, Quernheim (DE); Manfred Heidemann, Belm-Vehrte (DE); Hans Prins, Damme (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 12/513,196

(22) PCT Filed: Sep. 11, 2007

(86) PCT No.: PCT/DE2007/001616
§ 371 (c)(1),
(2), (4) Date: May 1, 2009

(87) PCT Pub. No.: WO2008/055454
PCT Pub. Date: May 15, 2008

(65) Prior Publication Data
US 2010/0008714 A1    Jan. 14, 2010

(30) Foreign Application Priority Data
Nov. 3, 2006 (DE) .......................... 10 2006 052 254

(51) Int. Cl.
*F16C 11/00* (2006.01)
(52) U.S. Cl. ..................................... 403/135
(58) Field of Classification Search .............. 403/142, 403/143, 132, 133, 135, 122
See application file for complete search history.

(56) References Cited

U.S. PATENT DOCUMENTS

| | | | | |
|---|---|---|---|---|
| 2,292,675 | A * | 8/1942 | Thiry | 403/133 |
| 2,308,968 | A * | 1/1943 | Gregory | 219/149 |
| 3,362,735 | A * | 1/1968 | Maxeiner | 403/132 |
| 4,318,627 | A * | 3/1982 | Morin | 403/133 |
| 4,504,166 | A * | 3/1985 | Morin | 403/147 |
| 4,681,475 | A * | 7/1987 | Kanegawa | 403/40 |
| 4,790,682 | A * | 12/1988 | Henkel | 403/140 |
| 5,154,530 | A | 10/1992 | Dresselhouse | |
| 5,247,731 | A * | 9/1993 | Ramillon | 29/511 |
| 5,395,176 | A * | 3/1995 | Zivkovic | 403/122 |
| 5,417,512 | A | 5/1995 | Chamberlin | |
| 5,697,723 | A * | 12/1997 | Wood | 403/135 |
| 5,704,727 | A * | 1/1998 | Atkins et al. | 403/135 |
| 5,752,780 | A * | 5/1998 | Dorr | 403/135 |
| 5,782,574 | A * | 7/1998 | Henkel | 403/135 |
| 5,882,137 | A * | 3/1999 | Epp et al. | 403/135 |
| 6,488,436 | B1 * | 12/2002 | Modat | 403/135 |
| 6,688,799 | B2 * | 2/2004 | Broker et al. | 403/135 |
| 6,733,200 | B2 * | 5/2004 | Ueno | 403/133 |

(Continued)

FOREIGN PATENT DOCUMENTS

DE  100 05 979 A1  8/2001

(Continued)

*Primary Examiner* — Daniel Stodola
*Assistant Examiner* — Daniel Wiley
(74) *Attorney, Agent, or Firm* — McGlew and Tuttle, P.C.

(57) ABSTRACT

A ball and socket joint for a motor vehicle is provided with a ball pivot (1), which is accommodated rotatably and pivotably in a one-part or multipart bearing shell (4) fixed by a closing ring (2) in a housing (3). A metallic deformation element (5), which assumes a sealing function in the assembled state of the ball and socket joint, is arranged between the closing ring (2) and the housing (3). The deformation element (5) is elastically deformed during the assembly of the ball and socket joint and is arranged at the housing (3) and/or at the closing ring (2).

15 Claims, 3 Drawing Sheets

U.S. PATENT DOCUMENTS

| | | | |
|---|---|---|---|
| 6,902,345 B2 * | 6/2005 | Kur | 403/135 |
| 7,004,665 B2 * | 2/2006 | Wasylewski et al. | 403/135 |
| 7,040,833 B2 * | 5/2006 | Kondoh | 403/140 |
| 7,261,488 B2 * | 8/2007 | Dobson et al. | 403/133 |
| 7,357,590 B2 * | 4/2008 | Hoppner et al. | 403/122 |
| 7,357,591 B2 * | 4/2008 | Broker et al. | 403/132 |
| 2003/0081989 A1 * | 5/2003 | Kondoh | 403/135 |
| 2004/0047677 A1 * | 3/2004 | Schonhoff et al. | 403/135 |
| 2004/0057781 A1 * | 3/2004 | Bohne et al. | 403/135 |
| 2004/0146338 A1 * | 7/2004 | Broker et al. | 403/135 |

FOREIGN PATENT DOCUMENTS

| | | |
|---|---|---|
| EP | 0 481 212 A1 | 4/1992 |
| EP | 1 432 920 B1 | 8/2005 |
| WO | WO 03/031834 A1 | 4/2003 |
| WO | WO 03/058080 A1 | 7/2003 |

* cited by examiner

SEALING ELEMENT FOR A BALL AND SOCKET JOINT

CROSS REFERENCE TO RELATED APPLICATIONS

This application is a United States National Phase application of International Application PCT/DE 2007/001616 and claims the benefit of priority under 35 U.S.C. §119 of German Patent Application 10 2006 052 254.0 filed Nov. 3, 2006, the entire contents of which are incorporated herein by reference.

FIELD OF THE INVENTION

The present invention pertains to a ball and socket joint for a motor vehicle with a ball pivot, which is accommodated rotatably and pivotably in a one-part or multipart bearing shell fixed in a housing by a closing ring. A metallic deformation element performing a sealing function is located between the closing ring and the housing in the assembled state of the ball and socket joint.

BACKGROUND OF THE INVENTION

Such a ball and socket joint is already known from EP 1 432 920 B1. The ball and socket joint disclosed in said document has a deformation element, which is called "upsetting element" in the document and which may be arranged either at the closing ring or at a surface of the housing that is suitable herefor. The deformation element is upset during the assembly of the ball and socket joint, i.e., it is plastically deformed. To make it possible to achieve this plastic deformation, the material must be selected within narrow limits in such embodiments, because one of the corresponding components (closing ring or housing) must consist of a relatively soft material and the other of a material having a higher strength. Attention shall also be paid to the proper selection of the material pair in respect to the development of an electrochemical contact corrosion. For example, aluminum is frequently used, which also does have considerable advantages concerning its lower weight, but aluminum is a cost-intensive material. Furthermore, the manufacturing effort needed for the prior-art ball and socket joints is relatively great, because application of a considerable force is needed to upset the deformation element. This in turn requires the use of additional time and energy to manufacture the ball and socket joint.

SUMMARY OF THE INVENTION

The inventors have set the task of perfecting a prior-art ball and socket joint such that the sealing of the inner joint components as a whole is improved and a cost-effective embodiment should also be obtained at the same time.

According to the invention, a ball and socket joint is provided for a motor vehicle with a ball pivot, which is accommodated rotatably and pivotably in a one-part or multipart bearing shell fixed by a closing ring in a housing, wherein a metallic deformation element, which assumes a sealing function in the assembled state of the ball and socket joint, is arranged between the closing ring and the housing. The deformation element, which is elastically deformed during the assembly of the ball and socket joint, is arranged at the housing and/or at the closing ring.

The deformation element may advantageously be made integrally in one piece with the housing and/or with the closing ring. The deformation element may advantageously have a sawtooth-like cross-sectional contour prior to its deformation.

A contact surface associated with the deformation element may advantageously have a contour promoting the directed deformation of the deformation element during the assembly of the ball and socket joint. The deformation element may advantageously have an arc-shaped section after its deformation. The arc-shaped section of the deformation element forms a seal with the contact surface. The deformation element may have a circumferential sealing surface after its deformation.

The inventors have recognized that for a ball and socket joint of a motor vehicle with a ball pivot, which is accommodated rotatably and pivotably in a one-part or multipart bearing shell fixed in a housing by a closing ring, wherein a metallic deformation element performing a sealing function is arranged between the closing ring and the housing in the assembled state, it is especially advantageous if the deformation element is elastically deformed during the assembly of the ball and socket joint and is arranged at the housing and/or at the closing ring.

Optimal sealing of the inner joint components of a ball and socket joint can be achieved due to the deformation element being designed as an elastic member. The elastic properties of the deformation element cause external effects, for example, temperature, caused tolerances, to be compensated without problems within the sealing area. The departure from plastic deformation of the deformation element in favor of elastic deformation thus represents an essential improvement of the ball and socket joint according to the present invention. In addition, there are hardly any limitations now concerning the selection of the material for the closing ring and the housing. This has the advantage that both components can be made, for example, of a high-strength material such as steel. Not only is it thus possible to lower the manufacturing costs, but such a ball and socket joint according to the present invention can also have smaller dimensions at increased strength parameters.

Corresponding to one embodiment of this inventive idea, it is proposed that the deformation element be made integrally in one piece with the housing and/or closing ring. Due to the one-piece design of the deformation element at the housing and/or closing ring, this housing can be manufactured without an additional manufacturing effort during the manufacture of the particular component. It is thus also possible to embody any desired cross-sectional geometry.

Corresponding to a variant of the present invention, the inventors propose that the deformation element have a sawtooth-like cross-sectional contour prior to its deformation. Since the closing ring of the ball and socket joint is being moved into the housing during its insertion, while the deformation element is deformed, a sawtooth-like cross-sectional contour of the deformation element is particularly suitable for promoting the elastic deformation.

To further improve a directed deformation of the deformation element, it is, furthermore, proposed that a contact surface associated with the deformation element have a contour promoting the directed deformation of the deformation element during the assembly of the ball and socket joint. The mutually corresponding surfaces are thus the contact surface, on the one hand, and the sloped surface of the sawtooth-like cross-sectional contour of the deformation element, on the other hand. A specific and predefinable deformation of the deformation element can thus be embodied during the axial forward motion of the closing ring into the housing as a consequence of the formation of the surfaces contacting one another.

Accordingly, the deformation element preferably has an arc-shaped section after its deformation. The originally sawtooth-like cross-sectional contour of the deformation element is thus elastically deformed into an arc-shaped section. This arc-shaped section has proved to be an especially advantageous sealing surface, because it also makes available a sealing surface of sufficient width besides its optimal elasticity.

The arc-shaped section of the deformation element forms a seal with the corresponding contact surface. A sealing surface, which is a circumferential surface after the elastic deformation of the deformation element, is formed now. A circumferential ring seal can thus be embodied by the deformation element according to the present invention between the closing ring and the housing of the ball and socket joint, and the drawbacks of the state of the art can be avoided.

Other features and advantages of the present invention appear from the subclaims and the following description of a preferred exemplary embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
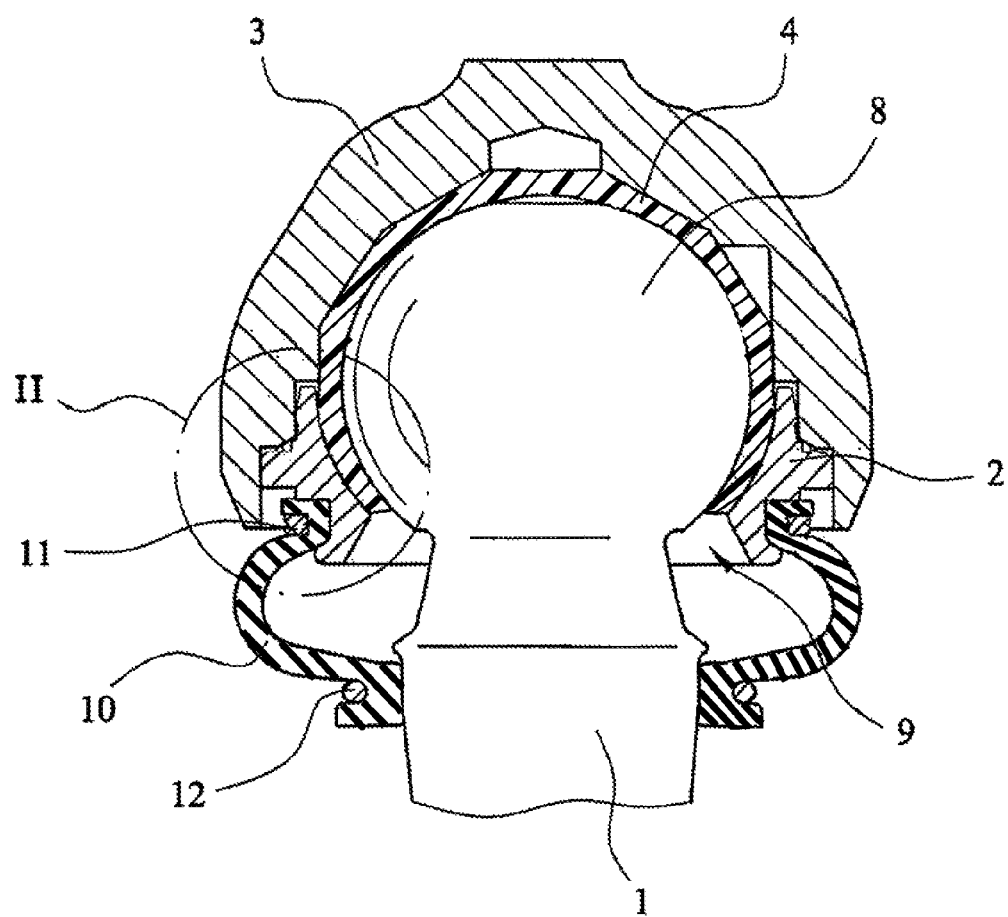
FIG. 1 is a cross section through a ball and socket joint with the features according to the present invention.

Referring to the drawings in particular, the exemplary embodiment of a ball and socket joint according to the present invention shown in FIG. 1 shows a cross-sectional shape along the central longitudinal axis of the non-deflected ball pivot 1. The ball pivot 1 is mounted rotatably and pivotably within the housing 3. To improve the mounting properties between the ball pivot 1 and the housing 3, a bearing shell 4 is present, which nearly completely surrounds the joint ball 8 formed at the ball pivot 1 and is inserted into housing 3. A closing ring 2 is used to fix the bearing shell 4 within the housing 3. On its outer surface, this closing ring 2 has a sawtooth-like structure, by means of which it can be fixed in housing 3 in the known manner. The closing ring 2 is also used to accommodate the edge area of a sealing bellows 10. A straining ring 11 is used to fix this edge area of the sealing bellows 10. The other end of the sealing bellows 10 is fixed with its edge area directly to the ball pivot 1 of the ball and socket joint. A straining ring 12 is used here as well in order to fix the edge of the sealing bellows 10. The sealing bellows 10 thus seals the housing opening 9 present at the housing 3 on one side.

To also make possible optimal sealing against the penetration of moisture and dirt into the interior of the ball and socket joint in the area of the connection between the housing 3 and the closing ring 2, the solution according to the present invention will be explained in more detail below on the basis of enlarged detail II from FIG. 1.

Figure 2:
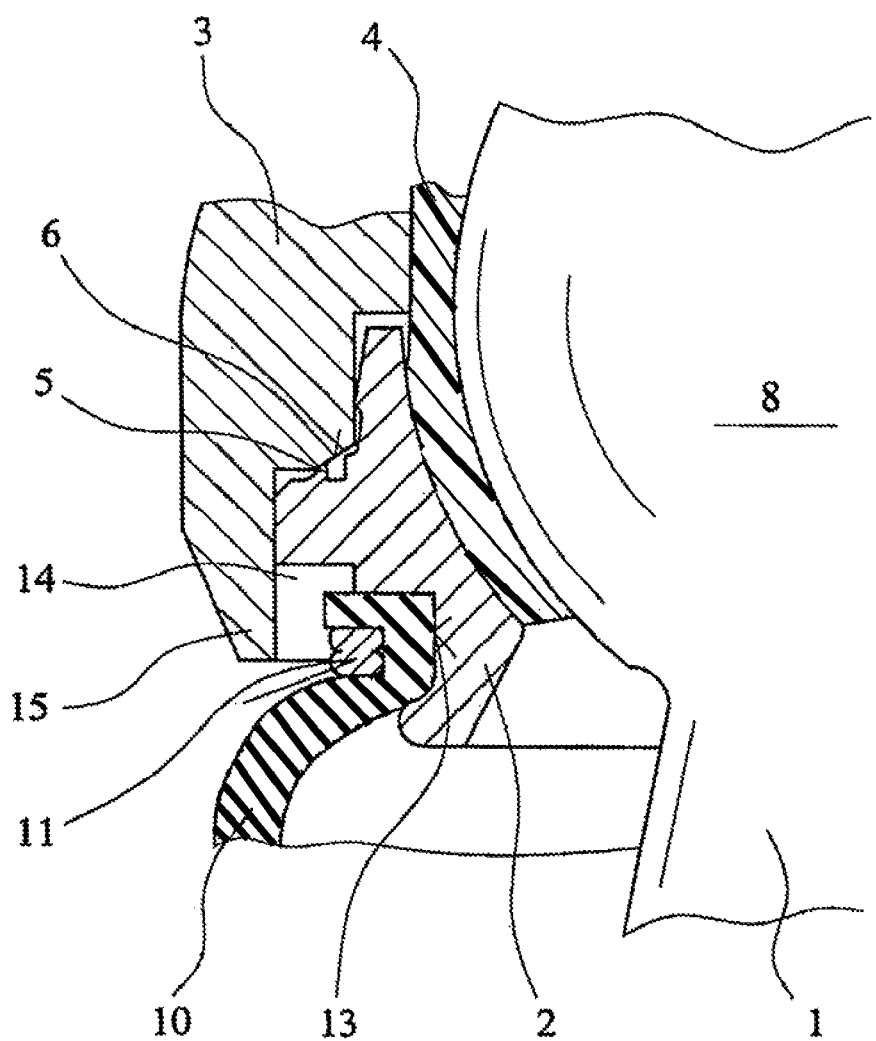
FIG. 2 is an enlarged view of detail II from FIG. 1 during the assembly of the ball and socket joint.

FIG. 2 shows partial area II from FIG. 1 as an enlarged detail. The ball pivot 1 is accommodated with its joint ball 8 rotatably and pivotably in a bearing shell 4 in the manner already described before. The bearing shell 4 is in turn inserted into the housing 3. The closing ring 2 is used to fix the bearing shell 4 within the housing 3. This closing ring 2 is moved into the housing 3 during the assembly of the housing 3. The sawtooth-like contour formed on the outer surface of the closing ring 2 progressively meshes now with the corresponding surface of housing 3, which surface is provided herefor. A preliminary fixation of the position of the closing ring 2 within the housing 3 can thus be achieved. The closing ring 2 is at first moved into the housing 3 to the extent that the deformation element 5 present at the closing ring comes into contact with the contact surface 6 (also referred to herein as the "housing inner angular surface") of the housing 3, which said contact surface 6 is located opposite thereto. By applying an increased pressing-in force, the deformation element 5, which still had a sawtooth-like cross section up to this point in time, is elastically deformed in a subsequent step. The shape of the contact surface 6 now supports a directed deformation motion of the deformation element 5. A sealing surface is formed between the closing ring 2 and the housing 3. The housing opening edge section 15 surrounding the housing opening 9 is subsequently deformed in the direction of the joint ball 8 of the ball pivot 1 such that it comes into contact with the flange 14 formed at the closing ring 2. The closing ring 2 is thus definitively fixed in its position. Dirt or moisture possibly penetrating in the area between the flange 14 and the housing opening edge section 15 is reliably retained by the deformed deformation element 5, which now forms a sealing surface. Optimized sealing of the ball and socket joint according to the present invention is obtained, on the whole, in cooperation with the sealing bellows 10 inserted into the groove 13 of the closing ring 2.

Figure 3:
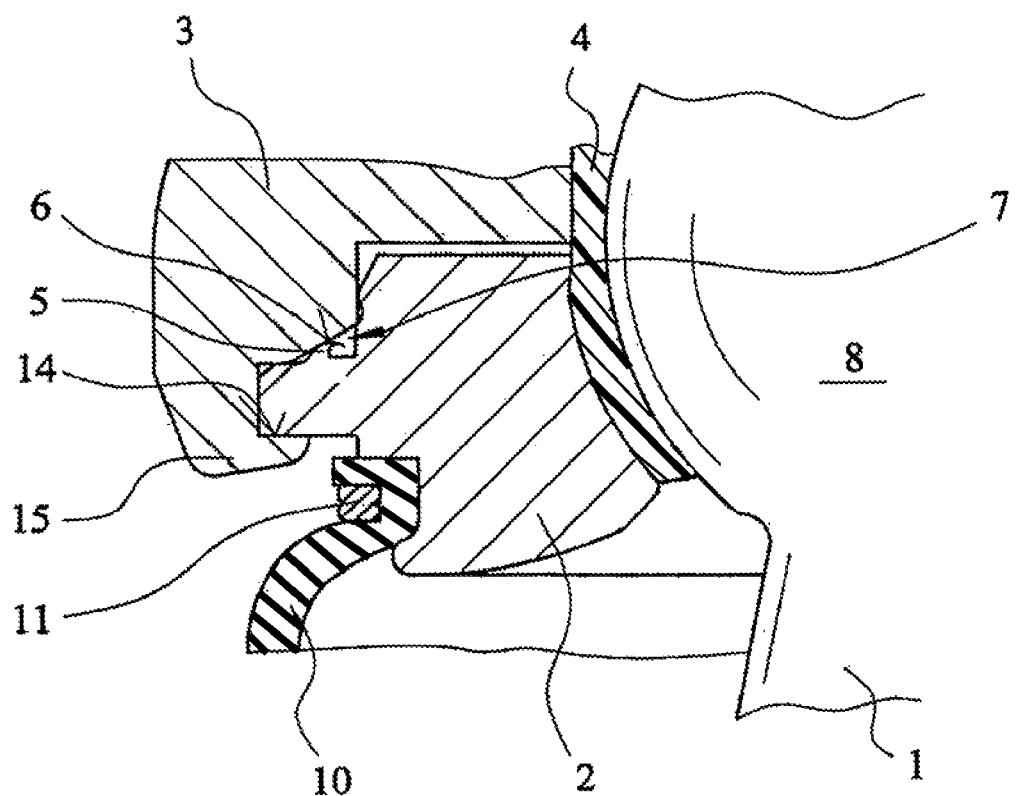
FIG. 3 is an enlarged detail of the partial area II of a ball and socket joint shown in FIG. 2 for a completely mounted ball and socket joint.

FIG. 3 shows once again an enlarged detail of a sectional view showing the state of the ball and socket joint after it has been finished. In particular, the arc-shaped section 7 of the deformation element 5 is of significance, because this forms the already described sealing surface with the corresponding contact surface 6 of the housing 3. Furthermore, FIG. 3 shows the deformed housing opening edge section 15, which is directly in contact with the flange 14 of the closing ring 2.

It is apparent that the above-mentioned features of the present invention can be used not only in the particular combination described, but in other combinations or alone as well, without going beyond the scope of the present invention. Bringing about a mechanical reversal of the functions of the individual mechanical elements of the present invention is also within the framework of the present invention.

While specific embodiments of the invention have been described in detail to illustrate the application of the principles of the invention, it will be understood that the invention may be embodied otherwise without departing from such principles.

LIST OF REFERENCE NUMBERS

1 Ball pivot
2 Closing ring
3 Housing
4 Bearing shell
5 Deformation element
6 Contact surface 7 Arc-shaped section
8 Joint ball
9 Housing opening
10 Sealing bellows
11 Straining ring
12 Straining ring
13 Groove
14 Flange
15 Housing opening edge section

The invention claimed is:

1. A ball and socket joint for a motor vehicle, the ball and socket joint comprising:
a bearing shell;
a ball pivot accommodated rotatably and pivotably in said bearing shell;
a housing;
a closing ring in said housing, said bearing shell being fixed in said housing by said closing ring; and
a metallic deformation element integrally connected to said closing ring, at least a portion of said deformation element extending from said closing ring in an axial direction towards said housing, said deformation element being elastically deformed during assembly of said ball and socket joint, said housing comprising a housing inner surface in contact with said closing ring, said housing inner surface comprising:
a housing inner radial surface;
a housing inner axial surface disposed radially inward of said housing inner radial surface; and
a housing inner angular surface extending between said housing inner radial surface and said housing inner axial surface, said housing inner angular surface engaging said deformation element such that at least a portion of said deformation element is elastically deformed radially inwardly.

2. A ball and socket joint in accordance with claim 1, wherein the deformation element has a sawtooth-like cross-sectional contour prior to its deformation.

3. A ball and socket joint in accordance with claim 1, wherein said housing inner angular surface has a contour promoting the directed deformation of the deformation element during the assembly of the ball and socket joint.

4. A ball and socket joint in accordance with claim 3, wherein an arc-shaped section of the deformation element forms a seal with said housing inner angular surface.

5. A ball and socket joint in accordance with claim 1, wherein the deformation element has an arc-shaped section after deformation thereof.

6. A ball and socket joint in accordance with claim 5, wherein the arc-shaped section of the deformation element forms a seal with said housing inner angular surface.

7. A ball and socket joint in accordance with claim 1, wherein the deformation element has a circumferential sealing surface after its deformation.

8. A motor vehicle ball and socket joint comprising:
a bearing shell;
a ball pivot with a joint ball accommodated rotatably and pivotably in said bearing shell;
a housing;
a closing ring, said bearing shell being fixed in said housing by said closing ring; and
an elastically deformable metallic deformation element integrally connected with said closing ring, said deformation element sealing a space between said closing ring and said housing, said deformation element being elastically deformed during assembly of the ball and socket joint, said housing comprising a housing inner surface in contact with said closing ring, said housing inner surface comprising:
a housing inner radial surface;
a housing inner axial surface disposed radially inward of said housing inner radial surface; and
a housing inner angular surface extending between said housing inner radial surface and said housing inner axial surface, said housing inner angular surface engaging said deformation element such that at least a portion of said deformation element is elastically deformed radially inwardly.

9. A ball and socket joint in accordance with claim 8, wherein the deformation element has a sawtooth cross-sectional contour prior to its deformation with each side of the sawtooth having an arcuate surface upon being elastically deformed to form a deformed surface.

10. A ball and socket joint in accordance with claim 8, wherein said housing inner angular surface has an angled contour for deforming said elastically deformable metallic deformation element in a direction to form a deformed surface.

11. A ball and socket joint in accordance with claim 10, wherein said deformed surface has an arc-shaped section that forms a seal with said housing inner angular surface.

12. A ball and socket joint in accordance with claim 8, wherein a deformation element deformed surface has an arc-shaped section.

13. A ball and socket joint in accordance with claim 12, wherein the arc-shaped section of the deformation element deformed surface forms a seal with said housing inner angular surface.

14. A ball and socket joint in accordance with claim 8, wherein the deformation element has a circumferential sealing surface after its deformation.

15. A motor vehicle ball and socket joint comprising:
a bearing shell;
a ball pivot with a joint ball accommodated rotatably and pivotably in said bearing shell;
a housing;
a closing ring, the bearing shell being fixed in said housing by said closing ring;
an elastically deformable metallic deformation element integrally connected with said closing ring, at least a portion of said deformation element extending from said closing ring in an axial direction towards said housing, said housing comprising a housing inner surface in contact with said closing ring, said housing inner surface comprising:
a housing inner radial surface;
a housing inner axial surface disposed radially inward of said housing inner radial surface; and
a housing inner angular surface extending between said housing inner radial surface and said housing inner axial surface, said housing being connected to said closing ring such that said housing inner angular surface compresses at least a portion of said deformation element radially inwardly to form an elastically deformed surface in direct contact with said housing inner angular surface, said direct contact of said elastically deformed surface and said housing inner angular surface sealing a space between said closing ring and said housing.

* * * * *